United States Patent
Kuhnen et al.

(10) Patent No.: US 11,275,010 B2
(45) Date of Patent: Mar. 15, 2022

(54) MONITORING THE STATE OF A COIL IN A SENSOR

(71) Applicant: Endress+Hauser SE+Co. KG, Maulburg (DE)

(72) Inventors: Raphael Kuhnen, Schliengen (DE); Ralf Wacker, Steinen (DE); Izabella Sandor, Schopfheim (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 112 days.

(21) Appl. No.: 16/628,710

(22) PCT Filed: Jun. 19, 2018

(86) PCT No.: PCT/EP2018/066254
§ 371 (c)(1),
(2) Date: Jan. 6, 2020

(87) PCT Pub. No.: WO2019/007670
PCT Pub. Date: Jan. 10, 2019

(65) Prior Publication Data
US 2020/0191693 A1    Jun. 18, 2020

(30) Foreign Application Priority Data
Jul. 6, 2017    (DE) .................. 10 2017 115 147.8

(51) Int. Cl.
*G01N 11/16* (2006.01)
*G01F 23/24* (2006.01)
(Continued)

(52) U.S. Cl.
CPC .......... *G01N 11/16* (2013.01); *G01F 23/241* (2013.01); *G01F 23/2967* (2013.01);
(Continued)

(58) Field of Classification Search
CPC .............................. G01N 11/16; G01N 9/002
See application file for complete search history.

(56) References Cited

U.S. PATENT DOCUMENTS

| | | | |
|---|---|---|---|
| 2004/0061511 A1* | 4/2004 | Kawakatsu | G01V 3/101 324/707 |
| 2007/0220947 A1 | 9/2007 | Keese et al. | |
| 2008/0078252 A1 | 4/2008 | Graber et al. | |

FOREIGN PATENT DOCUMENTS

| | | |
|---|---|---|
| CN | 101119024 A | 2/2008 |
| CN | 101294832 A | 10/2008 |

(Continued)

OTHER PUBLICATIONS

Wikipedia, Windungsschluss, https://de.wikipedia.org/w/index.php?title=Windungsschluss&oldid=121906382, 1 p.

(Continued)

*Primary Examiner* — Paul M. West
*Assistant Examiner* — Mark A Shabman
(74) *Attorney, Agent, or Firm* — Mark A. Logan; Endress+Hauser (USA) Holding Inc.

(57) ABSTRACT

The present invention relates to a method for monitoring state of a coil having at least two connection wires, which coil is part of an apparatus for determining at least one process variable of a medium in a containment, as well as relating to an apparatus for executing the method. The method, in such case, includes method steps as follows: ascertaining a desired-value of an ohmic total resistance for the coil and the connection wires, supplying the coil with an electrical excitation signal and receiving an electrical, received signal from the coil by means of the two connection wires, ascertaining an actual-value of the ohmic total resistance based at least on the received signal, and comparing (Continued)

the actual-value with the desired-value and ascertaining a state indicator based on the comparison.

13 Claims, 6 Drawing Sheets

(51) Int. Cl.
  *G01F 23/296* (2022.01)
  *G01F 25/00* (2022.01)
  *G01N 9/00* (2006.01)
(52) U.S. Cl.
  CPC ......... *G01F 25/0076* (2013.01); *G01N 9/002* (2013.01); *G01N 2009/006* (2013.01)

(56) References Cited

FOREIGN PATENT DOCUMENTS

| | | | |
|---|---|---|---|
| CN | 104769613 | A | 7/2015 |
| CN | 105634123 | A | 6/2016 |
| DE | 102005032134 | A1 | 1/2007 |
| DE | 102008032887 | A1 | 1/2010 |
| DE | 102010030982 | A1 | 1/2012 |
| DE | 102013020288 | A1 | 6/2015 |
| DE | 102015104533 | A1 | 9/2016 |
| DE | 102015112421 | A1 | 2/2017 |
| DE | 102015122284 | A1 | 6/2017 |
| DE | 102016112308 | A1 | 1/2018 |
| GB | 2348012 | A | 9/2000 |
| GN | 101517377 | A | 8/2009 |
| WO | 2007113011 | A1 | 10/2007 |
| WO | 2007114950 | A2 | 10/2007 |
| WO | 2013097991 | A1 | 7/2013 |

OTHER PUBLICATIONS

Wikipedia, Verlustwinkel, https://de.wikipedia.org/w/index.php?title=Verlustwinkel&oldid=136748095, 2 pp.
Kayser, D. S., Liptak, B. G., 3.21 Vibrating Level Switches, 4 pp. (556-559).
"Fundamentals of Electronic Measurement" Aug. 31, 2015, Mei HU, et al. Beijing Univertity of Posts and Telecomunications Press, pp. 109-114, 1-13.
"Guide to Electronic Experiments", Aug. 31, 2016, Mingli Lu, et al. Xidian University Press, pp. 4-6, 1-13.

* cited by examiner

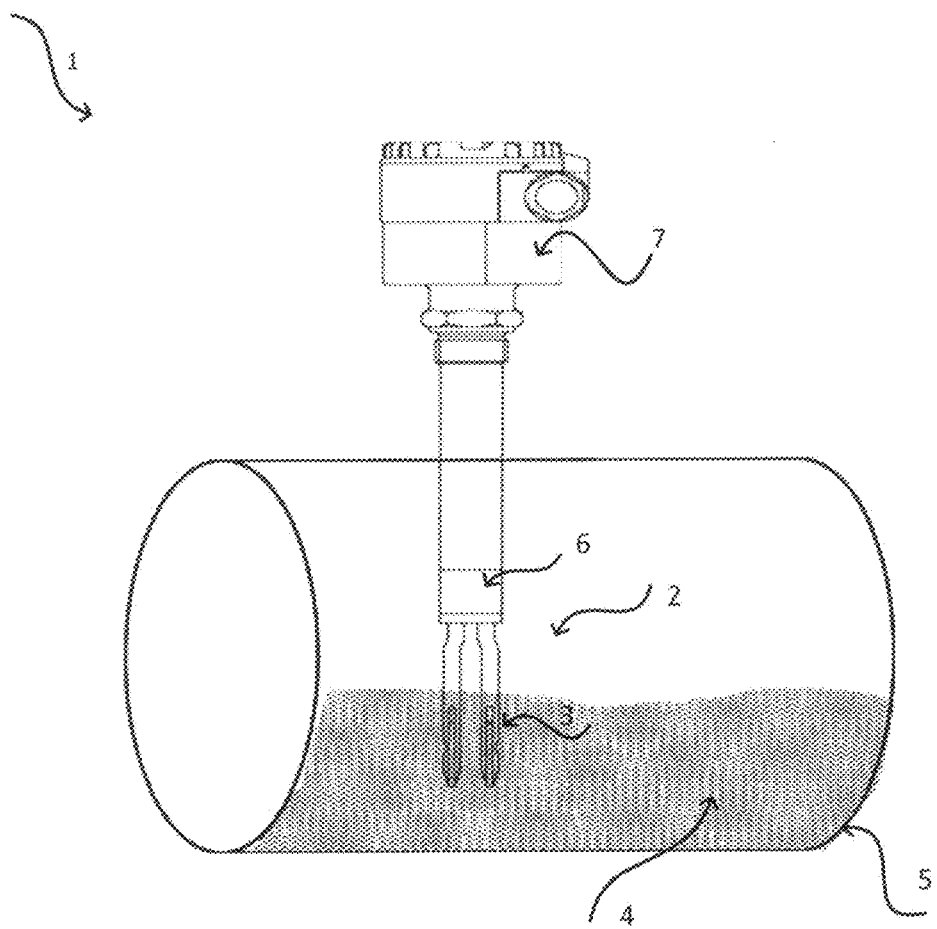
Fig. 1a
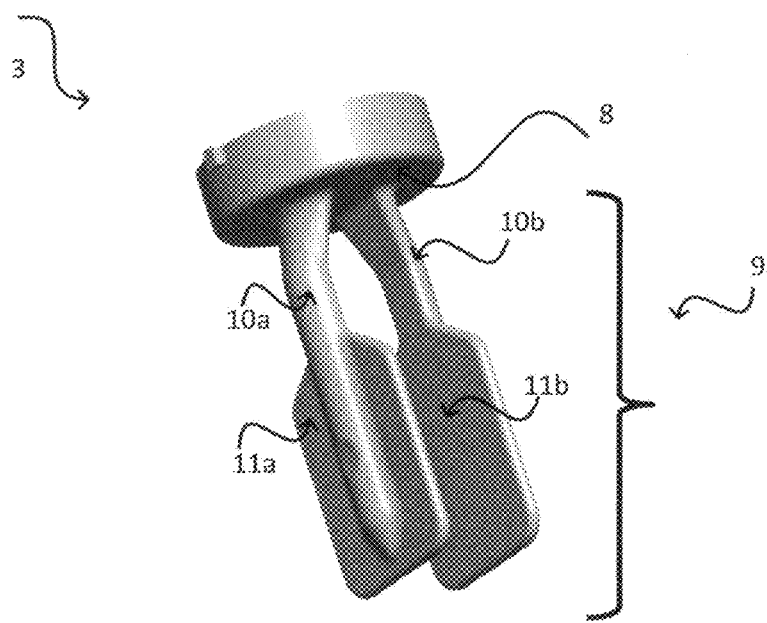
Fig. 1b
Fig. 1
(Prior Art)

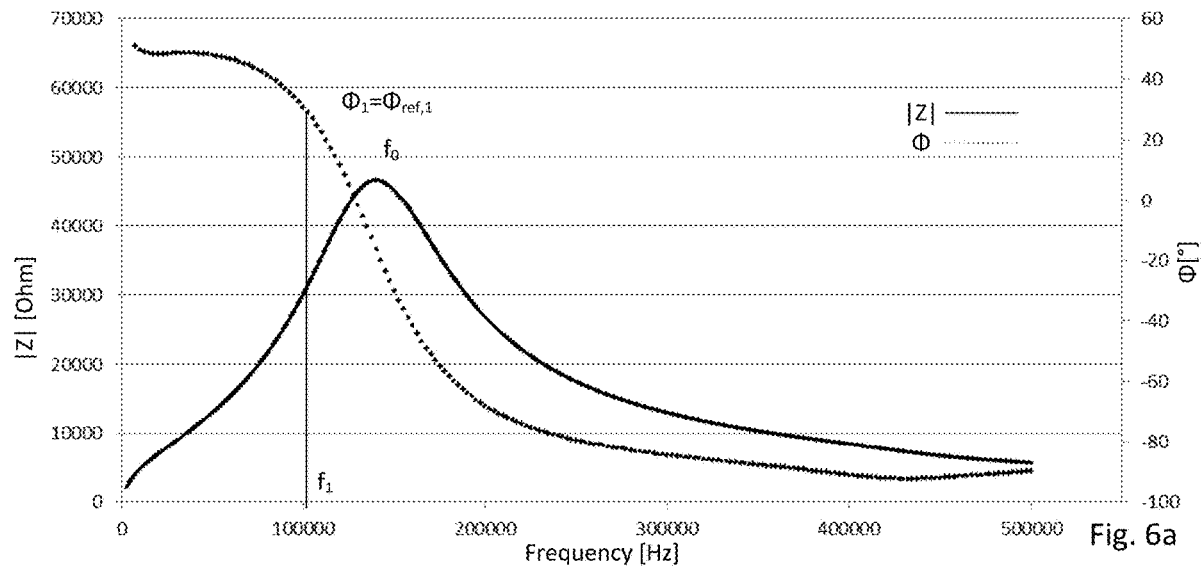
Fig. 6a
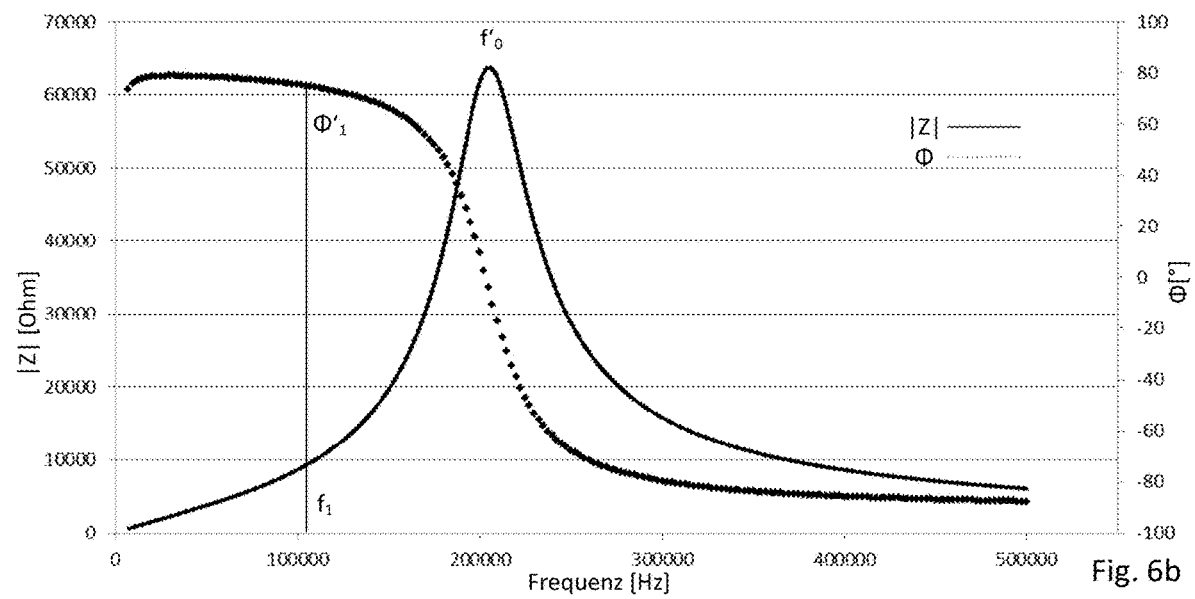
Fig. 6b
Fig. 6

MONITORING THE STATE OF A COIL IN A SENSOR

CROSS-REFERENCE TO RELATED APPLICATIONS

The present application is related to and claims the priority benefit of German Patent Application No. 10 2017 115 147.8, filed on Jul. 6, 2017 and International Patent Application No. PCT/EP2018/066254, filed on Jun. 19, 2018, the entire contents of which are incorporated herein by reference.

TECHNICAL FIELD

The invention relates to a method for monitoring state of a coil having at least two connection wires, which coil is part of an apparatus for determining and/or monitoring at least one process variable of a medium in a containment. The invention relates as well to an apparatus, which can execute a method of the invention. The apparatus is a field apparatus of process- and/or automation technology. For example, it can be a vibronic sensor, which includes a mechanically oscillatable unit, a driving/receiving unit having at least one coil and an electronics unit. The process variable is then, for example, the fill level or the flow of the medium or its density or viscosity. The medium is located in a containment, which in the context of the present invention includes a tank, a container or a pipeline. The medium, in turn, is, for example, a liquid, a gas, or a bulk good.

BACKGROUND

Vibronic sensors are widely applied in process and/or automation technology. In the case of fill-level measuring devices, such have at least one mechanically oscillatable unit, for example, an oscillatory fork, a single rod or a membrane. This is excited during operation by means of a driving/receiving unit, frequently in the form of an electromechanical transducer unit, such as a piezoelectric drive or an electromagnetic drive, to cause the mechanically oscillatable unit to execute mechanical oscillations. The mechanically oscillatable unit can in the case of flow measuring devices, however, also be embodied as an oscillatable tube flowed through by a medium, such as, for example, a measuring device working according to the Coriolis principle.

Corresponding field devices are produced by the applicant in great multiplicity and in the case of fill-level measuring devices sold, for example, under the marks, LIQUIPHANT and SOLIPHANT. The underpinning measuring principles are known, in principle, from a large number of publications. The driving/receiving unit excites the mechanically oscillatable unit by means of an electrical excitation signal to cause the mechanically oscillatable unit to execute mechanical oscillations. Conversely, the driving/receiving unit can receive the mechanical oscillations of the mechanically oscillatable unit and convert them into an electrical, received signal. The driving/receiving unit is correspondingly either a separate drive unit and a separate receiving unit, or a combined driving/receiving unit.

In such case, the driving/receiving unit is in many cases part of a fed back electrical, oscillatory circuit, by means of which the exciting of the mechanically oscillatable unit to execute mechanical oscillations occurs. For example, for a resonant oscillation, the oscillatory circuit condition must be fulfilled, according to which the amplification factor is greater than or equal to 1 and all phases arising in the oscillatory circuit must add to a multiple of 360°. For excitation and fulfillment of the oscillatory circuit condition, a certain phase shift between the excitation signal and the received signal must be assured. Therefore, frequently, a predeterminable value for the phase shift, thus a desired value for the phase shift, between the excitation signal and the received signal is set. The state of the art provides the most varied of solutions for this, both analog as well as also digital methods, such as described, for example, in DE102006034105A1, DE102007013557A1, or DE102005015547A1. The setting of a predeterminable phase shift is, moreover, possible by means of a so-called frequency sweep, such as disclosed, for example, in DE102009026685A1, DE102009028022A1, and DE102010030982A1, or also as based on a phase control loop (phase-locked loop, PLL). An excitation method based on a PLL is subject matter of, for example, DE00102010030982A1.

Both the excitation signal and also the received signal are characterized by frequency w, amplitude A and/or phase $\phi$. Correspondingly, changes of these variables are usually taken into consideration for determining the particular process variable, such as, for example, a specific fill level of a medium in a containment, or also a density and/or viscosity of a medium or the flow of a medium through a pipe or tube. In the case of a vibronic limit level switch for liquids, for example, it is distinguished, whether the oscillatable unit is covered by the liquid or freely oscillating. These two states, the free state and the covered state, are, in such case, distinguished, for example, based on different resonance frequencies, thus a frequency shift. The density and/or viscosity can, in turn, be ascertained with such a measuring apparatus only when the oscillatable unit is covered by the medium. Various methods for determining viscosity and/or density of a medium are set forth, for example, in DE10050299A1, DE102007043811A1, DE10057974A1, and DE102015102834A1.

Used for the driving/receiving unit are, especially, piezoelectric and/or electromagnetic driving/receiving units. In the case of driving/receiving units based on the piezoelectric effect, as a rule, a comparatively high efficiency can be achieved. Here, efficiency refers to the efficiency of converting electrical into mechanical energy. Used as materials are frequently piezoceramic materials based on LZT (lead zirconate titanate). These are normally suited, however, only for a limited temperature range of up to about 300° C. While there are piezoceramic materials, which keep their piezoelectric properties at temperatures above 300° C., they have the disadvantage that they are significantly less effective than the LZT-based materials. For use in vibronic sensors, these high temperature materials are, moreover, only limitedly suitable, because of the large differences in the coefficients of thermal expansion of metals and ceramic materials. Because of its function as force provider for exciting the mechanical oscillations of the oscillatable unit, the piezoelectric element must be connected for force transmission to the oscillatable unit. Especially in the case of high temperatures, however, large mechanical stresses arise, which can break the piezoelectric element and, associated therewith, lead to a total failure of the sensor.

An alternative, which can be better for high temperatures, are so-called electromagnetic driving/receiving units, such as, for example, described in WO 2007/113011, WO 2007/114950 A1, DE102015104533A1 or also in the German patent application No. 102016112308.0 unpublished at the date of first filing of this application. The changing of electrical energy into mechanical energy occurs, in such case, via a magnetic field. A corresponding electromechanical transducer unit includes at least one coil and a permanent magnet. By means of the coil, a magnetic alternating field passing through the magnet is produced, and via the magnet a periodic force is exerted on the oscillatable unit. Such a driving/receiving unit, depending on utilized materials, is applicable, for example, for a temperature range between −200° C. and 500° C.

In order to assure the reliable working of a vibronic sensor, the state of the art provides the most varied of methods for diagnosis of possible malfunctions of a vibronic sensor. The opportunity for a state monitoring or diagnosis is especially important in the case of safety-critical applications, such as, for example, use of a limit level switch in a containment filled with a combustible liquid. Depending on concrete application, the measuring apparatus must satisfy different safety requirements. In this regard, known, for example, is the so-called SIL (Safety Integrity Level) based on the standard, IEC61508, which distinguishes between four different levels for specification of the requirement for the safety integrity of safety functions. The safety requirement level provides, in such case, in principle, a measure for the reliability of the particular system, or measuring apparatus, as a function of a potential danger. Typically provided safety functions for assuring a certain level of safety integrity are, for example, given by emergency turn offs, e.g. turning off overheated devices.

For setting a safety integrity level, for example, the stoppage behavior of individual assemblies is examined. Furthermore, the presence of redundant structures is checked, as well as the rates of safe and unsafe, or dangerous, failures. From such considerations, a total failure rate can be determined, based on which a particular system, or measuring apparatus, can be assigned a certain safety integrity level.

DE102004027397A1 describes an opportunity for detecting a cable break in a vibronic sensor. Known from the documents DE10014724A1 and DE102009045204A1 are diagnostic techniques for detecting accretion in the region of the oscillatable unit. However, also diagnoses in the region of the driving/receiving unit are possible, such as, for example, the diagnosis of a piezoelectric driving/receiving unit described in DE102008032887A1.

SUMMARY

Starting from the state of the art, an object of the present invention is to provide a measuring apparatus, which meets high safety requirements.

Regarding the method, the object of the invention is achieved by a method for monitoring state of a coil having at least two connection wires, which coil is part of an apparatus for determining at least one process variable of a medium in a containment, which method includes method steps as follows:
ascertaining a desired-value of an ohmic total resistance for the coil and the connection wires,
supplying the coil with an electrical excitation signal and receiving an electrical, received signal from the coil by means of the two connection wires,
ascertaining an actual-value of the ohmic total resistance based at least on the received signal, and
comparing the actual-value with the desired-value and ascertaining a state indicator based on the comparison.

A coil comprises, as a rule, a wound coil wire having at least one winding and is electrically contacted by means of two connection wires. The coil can, in such case, optionally be wound on a coil body. Also, the coil can include a coil core. According to the invention, based on a comparison of an actual-value and a desired-value for the ohmic total resistance of a coil of a measuring apparatus, a defect or a malfunction of the coil or of at least one of the connection wires is detected. The total resistance includes, in such case, both contributions of the connection wires as well as also the contribution of the coil wire.

The coil is, for example, part of an electromagnetic receiving unit of a vibronic sensor. In this case, the method of the invention thus permits a diagnosis of the driving/receiving unit of the measuring device. The invention is, however, not limited to vibronic sensors. Rather, the method of the invention can be applied for state monitoring analogously also for other measuring devices comprising at least one coil, for example, magneto-inductive flow measuring devices. Preferably, the method of the invention is used for coils, which at least partially are associated with a sensor unit of the particular measuring device.

The state indicator can be a statement ranging from a poor electrical contacting to a cable break. In the case of a defective contacting, for example, an additional junction resistance can occur in the region of the defective contacting, which correspondingly also delivers a contribution to the ohmic total resistance of the coil. Alternatively or also supplementally, the state indicator can, however, also be a statement concerning a winding short in the region of the coil wire. Also a winding short leads to a change of the total resistance of the coil.

In an advantageous embodiment of the method, a difference between the actual-value and the desired-value is determined, wherein the state indicator is ascertained based on the difference. Especially, it can be checked whether the difference exceeds a predeterminable limit value and, when the difference exceeds the predeterminable limit value, a statement concerning the state of the coil is made.

Another preferred embodiment provides that an electrical equivalent circuit for the ohmic total resistance of the coil is created, wherein the desired-value for the total resistance is ascertained based on the equivalent circuit. The total resistance is established, in such case, from contributions of the coil wire and of the connection wires. The desired-value is thus calculated based on the equivalent circuit and then compared with an actual-value ascertained based at least on the received signal. The desired-value is then preferably stored in a memory, which can be located equally in an electronics unit of the measuring apparatus, or in an external memory unit, which can be accessed at least when needed.

Other options for determining a desired-value for the total resistance are, however, equally possible and fall likewise within the scope of the present invention. For example, in the context of manufacture of a measuring device or in the case of its delivery, a measured value can be measured for the ohmic total resistance and stored in a memory.

It is in connection with the equivalent circuit advantageous that each of the at least two connection wires be represented by a series circuit of a wire resistance and a wire defect resistance and/or that the coil be represented by a series circuit of a coil resistance and a coil defect resistance. In the ideal case, the wire defect resistances as well as the coil defect resistance are negligible and the desired values come essentially from the values for the wire resistances and the coil resistance. Under real conditions, however, differences are always to be expected between the different actual values for the resistances and the desired values. Then, from the wire defect resistances and the coil defect resistance, certain tolerance ranges, thus allowable, or tolerable differences from desired values, can be defined. It is, thus, advantageous that for at least one wire defect resistance and/or the coil defect resistance a predeterminable defect value is assumed.

The wire defect resistances and the coil defect resistance can, among others, be taken into consideration for definition of the predeterminable limit value for the difference between the actual-value and the desired-value for the ohmic total resistance. The predeterminable limit value can thus be calculated, or ascertained, from the defect resistances. When default defect resistances are given, then this procedure is, however, not absolutely necessary for the state monitoring of the invention.

In a preferred embodiment of the method, the state indicator is a statement of the presence of at least one winding short in the region of the coil or a statement of a poor electrical contacting or a cable break in the region of the coil or the at least two connection wires. In the case of a defective electrical contacting, especially a junction resistance coming from the poor contacting occurs in the contact region between a particular connection wire and the coil wire.

In an additional, preferred embodiment of the method, the excitation signal is an alternating signal, wherein for at least a first excitation signal with a first predeterminable frequency a first phase is ascertained between the excitation signal and the received signal, and wherein a difference between the first phase and a desired-value for the first phase is ascertained. From the phase shift between the excitation signal and the received signal at a predeterminable frequency, additional information concerning the state of the coil can be derived. In an electrical equivalent circuit diagram, the coil can be shown as an oscillatory circuit, such as will be explained in connection with FIG. 5.

The predeterminable frequency is in this connection preferably not a resonant frequency of the oscillatory system. In the case of a defect in the region of the coil, there is a shifting of the resonant frequency and, associated therewith, a shifting of the complete spectra of the amplitude of the received signal as well as the phase shift between the excitation signal and the received signal, in each case, as a function of frequency. Correspondingly, the actual-value of the phase deviates in the case of malfunction significantly, especially above a predeterminable limit value, from the desired-value of the phase.

Regarding the exciting of the coil with an alternating signal, it is advantageous that when the difference exceeds a first predeterminable limit value, a determination of at least one winding short in the region of the coil is made. In the case of a winding short in the region of the coil, there is a lessening of the inductance of the coil and, associated therewith, a positive shifting of the resonant frequency, or the complete spectra of the amplitude and phase as a function of frequency.

In the case of a cable break in the region of the connection wires or in the region of the coil wire or also in the case of the breaking of an electrical contacting between a connection wire and the coil wire, there is, in contrast, a complete interruption of the oscillatory circuit.

It is likewise advantageous that when the difference exceeds a second predeterminable limit value, a determination of presence of moisture or medium in at least one region, in which the coil is located, is made. The penetration of moisture or medium causes a change of a capacitance in an equivalent circuit diagram. Frequently, there is an increase of the capacitance. As a result, there occurs likewise a negative shifting of the resonant frequency. In given cases, also the quality of the oscillatory system can change.

In an additional embodiment, for at least a second excitation signal with a second predeterminable frequency, a second phase between the excitation signal and the received signal is ascertained, wherein a difference between the second phase and a desired-value is ascertained for the second phase. Especially, a difference between the actual values and desired values for the first and second phases corresponding to exciting with the first and second frequencies is ascertained. Since the phases for two different frequencies, which preferably both are not resonant frequencies of the oscillatory system, are ascertained, besides a simple lateral shifting of the resonant frequency, or phase, advantageously also a statement of a change of the quality of the oscillatory system can be made. Using this additional information, the state monitoring of the coil can be more precise.

Alternatively, it is also possible to compare a distance between the first and second phases with a desired-value for this distance. This procedure is, indeed, less complicated, however, in given cases, a shifting of the frequency cannot be detected without there being some doubt as to its correctness, or, for example, a change of the quality of the oscillatory system and a shifting of the resonant frequency can be distinguished.

An especially preferred embodiment of the method of the invention includes that the coil is divided into at least two subcoils and provided with at least three connection wires, wherein a first subcoil is contacted by means of a first and by means of a second connection wire, and wherein a second subcoil is contacted by means of the second and by means of a third connection wire. The coil is thus, generally stated, divided into n subcoils and electrically contacted by n+1 connection wires. By dividing the coil into at least two subcoils, it can advantageously be localized, whether a malfunction is present in the region of the coil wire or in the region of at least one of the connection wires. Moreover, in many cases, it can be exactly specified, which type of malfunction is present, thus whether it is, for example, a winding short or a poor electrical contacting. This is especially advantageous with reference to the functional safety of the particular measuring apparatus.

In the case of a subdividing of the coil into at least two subcoils, advantageously, at least one subresistance of a subcoil is ascertained. This subresistance can then, for example, be compared with a desired-value for the corresponding subresistance, analogously to the already described embodiments for the case of the total resistance of the coil. Preferably, also a plurality of subresistances can be ascertained and compared with corresponding desired values for these subresistances. In such case, subresistances for individual subcoils or also subresistances for combinations of at least two neighboring subcoils can be considered.

Likewise advantageously, at least one ratio of a subresistance and the total resistance or a ratio between at least two subresistances is/are formed. By forming ratios, different influences of the process conditions on the ascertaining of the particular subresistances, or of the total resistance, of the coil, such as, for example, the influence of the temperature of the medium, can be eliminated, or minimized.

The object of the invention is achieved, furthermore, by an apparatus for determining and/or monitoring at least one process variable of a medium in a containment, comprising a coil and at least two connection wires, which apparatus is embodied to execute a method as claimed in at least one of the described embodiments.

In a preferred embodiment, the apparatus is a vibronic sensor comprising
 a mechanically oscillatable unit,
 a driving/receiving unit having at least one coil and two connection wires, which driving/receiving unit is embodied to excite the mechanically oscillatable unit by means of an electrical excitation signal to cause the mechanically oscillatable unit to execute mechanical oscillations and to receive the mechanical oscillations from the oscillatable unit and to convert such into an electrical, received signal, and
 an electronics unit, which is embodied starting from the received signal to produce the excitation signal, and from the received signal to ascertain the at least one process variable.

BRIEF DESCRIPTION OF THE DRAWINGS

The embodiments described in connection with the method of the invention are applicable mutatis mutandis also for the apparatus of the invention and vice versa.

The invention as well as its advantageous embodiments will now be described in greater detail based on the appended drawing, the figures, FIG. 1-FIG. 6, of which show as follows:

FIG. 1 shows a schematic view of a vibronic sensor according to the state of the art.

DETAILED DESCRIPTION

Figure 2:
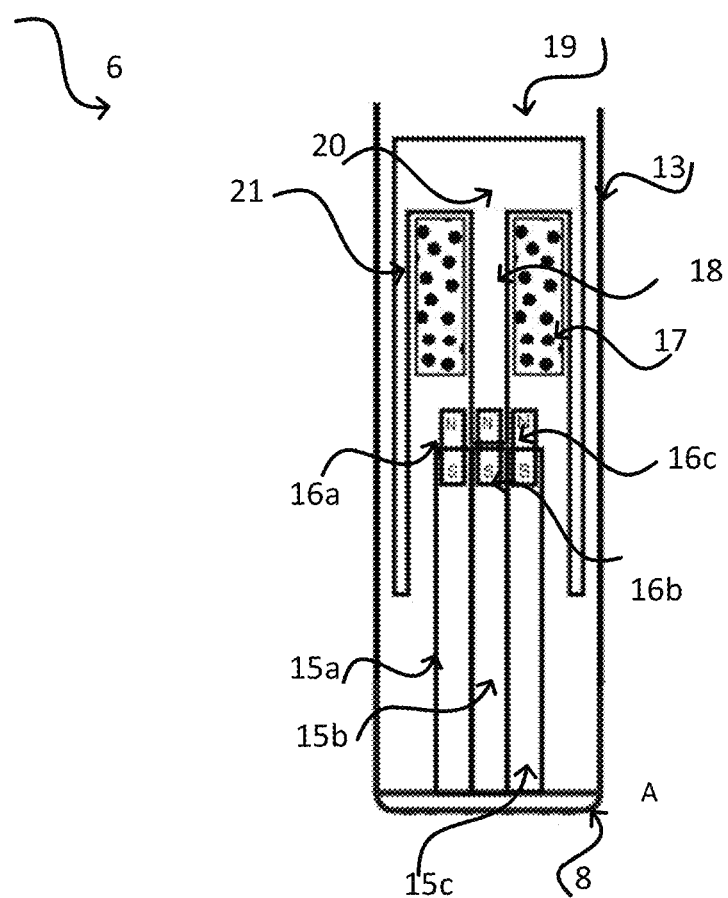
FIG. 2 shows an electromagnetic driving/receiving unit of a vibronic sensor according to the state of the art.

Although the present invention concerns generally coils in measuring apparatuses of process- and/or automation technology, the following description is limited, by way of example, to vibronic sensors. More exactly, the following description concerns a vibronic sensor with an electromagnetic driving/receiving unit comprising a coil and at least one magnet. The ideas of the method of the invention and the apparatus of the invention can be directly transferred to other measuring devices.

FIG. 1a shows a vibronic fill-level measuring apparatus 1. A sensor unit 2 with a mechanically oscillatable unit 3 in the form of an oscillatory fork protrudes partially into a medium 4, which is located in a containment 5. The oscillatable unit 3 is excited by means of the driving/receiving unit 6, as a rule, an electromechanical transducer unit, to cause the mechanically oscillatable unit to execute mechanical oscillations, and can be, for example, a piezoelectric stack- or bimorph drive, however, also an electromagnetic or also a magnetostrictive driving/receiving unit. It is understood, however, that also other embodiments of a vibronic fill-level measuring apparatus 1 are possible, which are not shown here. The measuring apparatus includes, moreover, an electronics unit 7, by means of which signal registration, —evaluation and/or—supply occurs.

FIG. 1b shows a more detailed view of an oscillatable unit 3 in the form of an oscillatory fork, such as, for example, used in the LIQUIPHANT measuring apparatus. Shown is a membrane 8, and an oscillatory element 9 connected therewith. Oscillatory element 9 includes two oscillatory rods 10a, 10b, on which are formed terminally paddles 11a, 11b. In operation, the oscillatory fork 3 executes oscillatory movements corresponding to the oscillatory mode, with which it is excited. Each of the two oscillatory rods 10a, 10b behaves essentially as a so called bending oscillator. In the fundamental oscillation mode, the two oscillatory rods 10a, 10b oscillate, for example, with opposite phase relative to one another.

Known from the state of the art are different embodiments for electromagnetic driving/receiving units. For purposes of simplification, the following description concerns a driving/receiving unit 6, such as described in DE102015104533A1 or also in German patent application No. 102016112308.0 unpublished at the date of first filing of this application. Comprehensive reference is taken to the two patent applications in the context of the present invention.

FIG. 2 shows a schematic view of such a driving/receiving unit 6. A housing 13 terminates in the lower region of the wall with a membrane 8, which is associated with the oscillatable unit 3. For the embodiment shown here, housing 13 is cylindrical and the disk-shaped membrane has a circularly round cross sectional area A. It is understood, however, that also other geometries provide options and fall within the scope of the present invention. Secured to the membrane 8 perpendicularly to its base area A and reaching into the interior of the housing 13 are three rods 15a, 15b, 15c. In such case, especially a force transmitting connection is used. The base area A of the membrane 8 lies then in a plane perpendicular to the longitudinal direction of the rods 15a, 15b, 15c. For example, the rods 15a, 15b, 15c are arranged at equal angles along an imaginary circular line around the midpoint M of the base area A of the membrane 8.

Secured in the end region of the rods 15a, 15b, 15c away from the membrane 8 is, in each case, a magnet 16a, 16b, 16c, especially an SmCo- or Alnico magnet. The magnets 16a, 16b, 16c are preferably all equally oriented. Other embodiments have 2 rods 15a and 15b as well as two magnets 16a and 16b or also four 15a-15d or more rods and four 16a-16d or more magnets. In the case of an even number of magnets 16a-16d, the magnets can also be pairwise equally oriented.

Arranged above the magnets 16a, 16b, 16c, in turn, is a coil 17, which comprises a wire wound around the core 18. Core 18 of the coil 17 is part of a pot-shaped armature unit 19 with a floor 20 as well as an enclosure 21. For example, the floor 20 can have a circular cross sectional area same as the base area A of the membrane 8. Core 18 of the coil 17 reaches from the floor 20 of the pot-shaped armature unit 19, in the form of a post, centrally into the interior of the armature unit 19. The enclosure 21 has, in this case, then the function of a magnetic field guide-back. The rods 15a-15c with the magnets 16a-16c do not contact the coil 17 and the core 18. The coil 17 is in the ongoing operation supplied with an alternating current signal for production of a magnetic, alternating field. For this, the coil has at least two connection wires (not shown in FIG. 2a).

Due to this alternating field, the rods 15a-15c are deflected via the magnets 16a-16c horizontally, i.e. perpendicularly, or transversely, to their longitudinal axes, in such a manner that they are caused to oscillate. On the one hand, the rods 15a-15c then have a lever action, by which the bending of the rods 15a-15c produced through the horizontal deflection is transferred to the membrane 8 in such a manner that the membrane 8 is caused to oscillate. On the other hand, the combination of the rods 15a-15c and the membrane 8 forms a resonator. The exciting of the membrane 8 to cause the mechanically oscillatable unit to execute mechanical oscillations occurs, thus, by means of a magnetic, alternating field.

By means of the present invention, a state monitoring of the coil 17 can be performed. For this, a desired-value $R_{tot,ref}$ for an ohmic total resistance of the coil 17 is ascertained. By supply of electrical power to the coil with an electrical excitation signal and evaluation of a signal received from the coil 17, then at predeterminable points in time, for example, periodically in predeterminable time intervals or individually upon query, an actual-value $R_{tot}$, for the ohmic total resistance of the coil 17 can be ascertained. Using a comparison of the actual-value $R_{tot}$ with the desired-value $R_{tot,ref}$, then a state indicator for the coil 17 can be ascertained. For example, a difference between the actual-value $R_{tot}$ and the desired-value $R_{tot,ref}$ can be determined. If the difference exceeds a predeterminable limit value, then the presence of a malfunction in the region of the coil 17 can be assumed. In such case, it can be, for example, a winding short of the coil wire 22 or an open electrical contact between the coil wire 22 and at least one of the connection wires 23a,23b.

Figure 3:
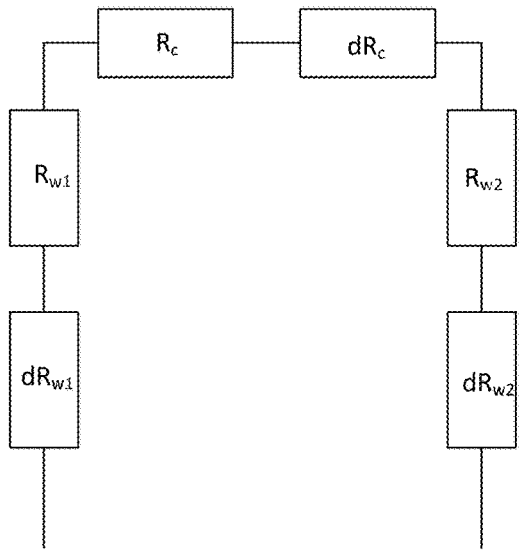
FIG. 3 shows an equivalent circuit diagram for the ohmic total resistance of a coil.

A desired-value $R_{tot}$ for the ohmic total resistance of the coil 17 can, in such case, on the one hand, be measured, for example, in the context of manufacture of a particular sensor 1 or upon its delivery. However, also a theoretical determination based on an electrical equivalent circuit, such as shown in FIG. 3, is possible. For such an equivalent circuit diagram, the most varied of embodiments provide options, which all fall within the scope of the present invention. Without limitation of generality, for the example shown here, the coil wire C is represented by a series circuit of a coil resistance Rc and a coil defect resistance $dR_C$ and the two connection wires $w_1$, $w_2$ likewise, in each case, by a wire-resistance $R_{w1}$, or $R_{w2}$ and, in each case, a wire defect resistance $dR_{w1}$, or $dR_{w2}$ connected thereto in series. Using the equivalent circuit, a desired-value $R_{tot,ref}$ for the total resistance of the coil 17 can be ascertained. In this regard, predeterminable defect values can be assumed for the defect resistances $dR_C$, $dR_{w1}$, $dR_{w2}$, which defect resistances, in principle, give maximum allowable tolerances for the resistances $R_C$, $R_{w1}$, $R_{w2}$. In this case, the predeterminable limit value for a difference between actual-value $R_{tot}$ and desired-value $R_{tot,ref}$ is defined, or specified, based on the defect resistances $dR_C$, $dR_{w1}$, $dR_{w2}$.

Figure 4:
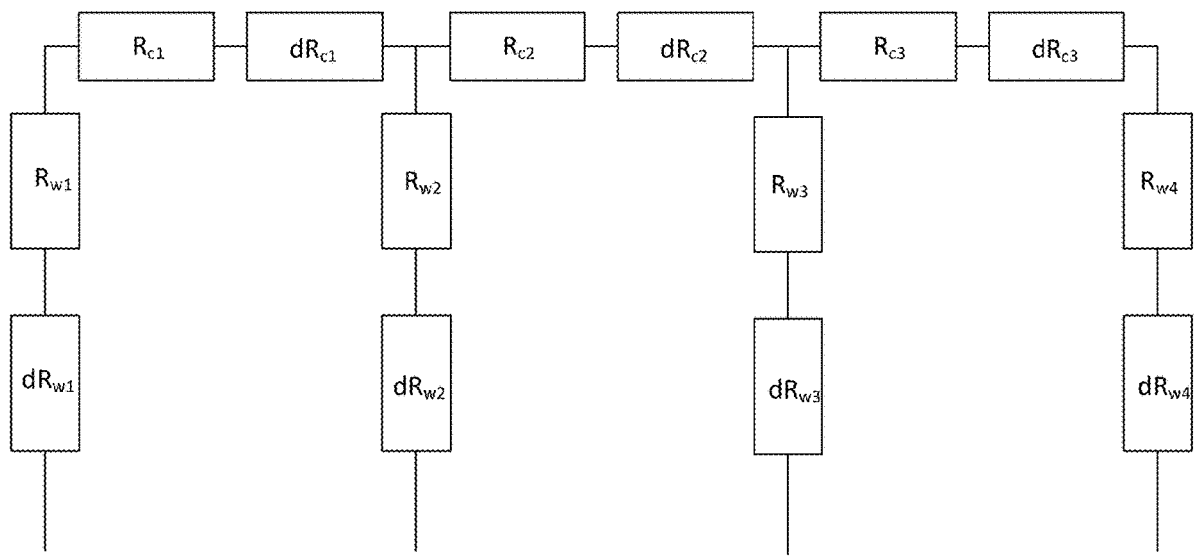
FIG. 4 shows an equivalent circuit diagram for the ohmic resistance of a coil subdivided into three subcoils.

Another preferred embodiment is shown in FIG. 4. The coil 17 is divided into three subcoils $C_1$, $C_2$ and $C_3$, and electrically contacted by means of four connection wires $w_1$-$w_4$. The first subcoil $C_1$ is contacted by means of the connection wires $w_1$ and $w_2$, the second subcoil $C_2$ by means of the connection wires $w_2$ and $w_3$, and the third subcoil $C_3$ by means of the connection wires $w_3$ and $w_4$. However, the coil 17 of the invention is subdividable into any number of at least two subcoils $C_1$ and $C_2$, wherein, in each case, n+1 connection wires are provided for n subcoils $C_1$-$C_n$. The following ideas can, in such case, be directly transferred to a plurality of subcoils unequal to three.

By subdividing the coil 17 into subcoils—in the present case into the three subcoils $C_1$, $C_2$ and $C_3$—a winding short or a lack of electrical contacting in the region of the coil can be advantageously better located. For this, as in the case of the total resistance $R_{tot}$, subresistances for each at least one subcoil $R_{C1}$, $R_{C2}$ and $R_{C3}$ can be ascertained, or for two adjoining subcoils $R_{C12}$ or $R_{C23}$. Similarly, such as in the case of the total resistance $R_{tot}$, or $R_{tot,ref}$ of the coil 17, actual values of the subresistances $R_{C1}$, $R_{C2}$, $R_{C3}$, $R_{C12}$ and/or $R_{C23}$ ascertained in the ongoing operation of the sensor 1 can be compared with corresponding desired values $R_{C1,ref}$, $R_{C2,ref}$, $R_{C3,ref}$, $R_{C12,ref}$ and/or $R_{C23,ref}$. For example, differences present in each case can be ascertained.

Analogously to the embodiment in FIG. 3, in FIG. 4, desired values for the subresistances and the total resistance are ascertained based on an equivalent circuit, in which the subcoils are represented by a series circuit of coil resistances $R_{C1}$-$R_{C3}$ and associated coil defect resistances $dR_{C1}$-$dR_{C3}$ and the connection wires analogously, in each case, by wire resistances $R_{w1}$-$R_{w4}$ and associated wire defect resistances $dR_{w1}$-$dR_{w4}$. Since the ohmic resistance of the coil wire C and the connection wires $w_1$-$w_4$ are temperature dependent, alternatively, ratios of various subresistances $R_{C1}$, $R_{C2}$, $R_{C3}$, $R_{C12}$ and/or $R_{C23}$ and/or at least one subresistance $R_{C1}$, $R_{C2}$, $R_{C3}$, $R_{C12}$ and/or $R_{C23}$ and the total resistance $R_{tot}$ can be considered. In such case, the influence of the process environment on the state monitoring can be eliminated, or minimized.

The coil 17 can basically be divided into a plurality of subcoils $C_1$-$C_n$ with at least partially different turns numbers as well as also into subcoils with at least pairwise equal turns numbers. Analogously the n+1 connection wires $w_1$-$w_{n+1}$ can be embodied essentially equally or they can be embodied at least partially differently. For example, the length and/or cross sectional area of the wires $w_1$-$w_{n+1}$ can vary.

In the case, in which for the embodiment of FIG. 4 the coil 17 is divided into three subcoils $C_1$-$C_3$, and likewise the connection wires $d_1$-$d_4$ are equally embodied, it is sufficient, because of the redundancy, to achieve a very good resistance based state monitoring, when the ratios $R_{C1}/R_{C2}$, $R_{C2}/R_{C3}$ as well as $R_{C12}/R_{C23}$ are formed and compared with the corresponding ratios of desired values $R_{C1,ref}/R_{C2,ref}$, $R_{C2,ref}/R_{C3,ref}$ as well as $R_{C12,ref}/R_{C23,ref}$. For this, for example, a so-called pivot table-table can be applied.

In the case of a cable break in a connection wire w1-wn or in a wire of one of the subcoils C1-Cn, a significant difference between the actual value and the desired value of the subresistance affected by the cable break is to be expected. In the case of a lacking electrical contact between a connection wire w1-wn and a wire of one of the subcoils C1-Cn, then the actual-value of the at least one affected subresistance rises compared with the not affected subresistances.

Figure 5:
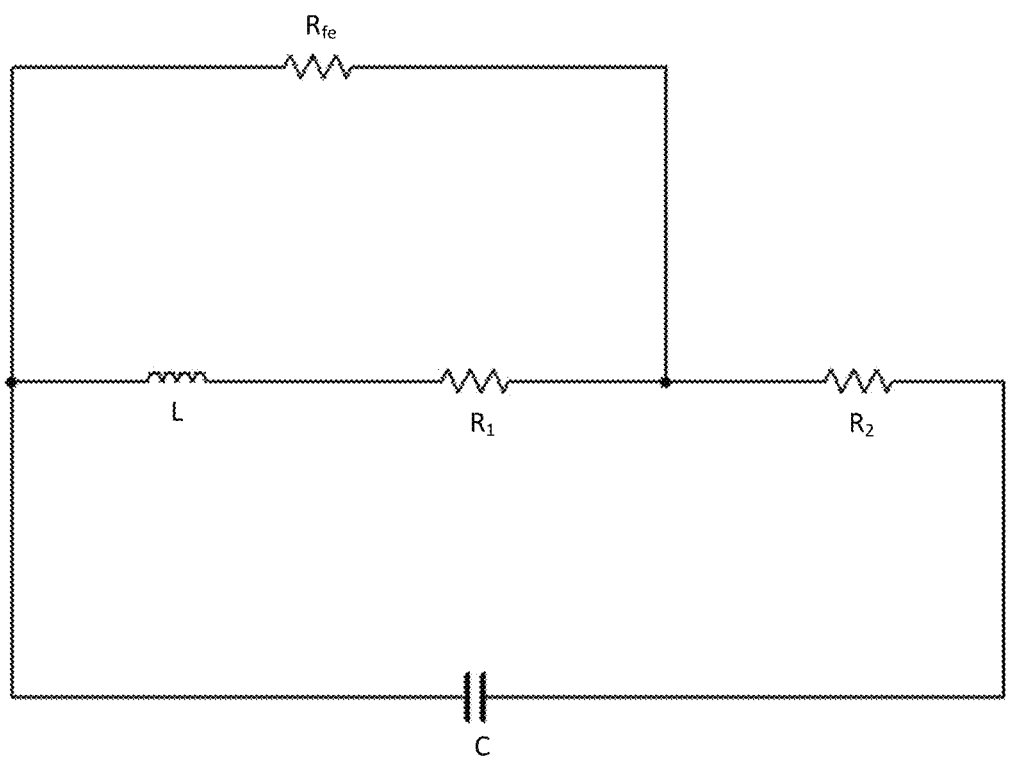
FIG. 5 shows an equivalent circuit diagram of a coil with core for illustrating state monitoring of the invention based on an alternating signal.
Figures 6, 6C:
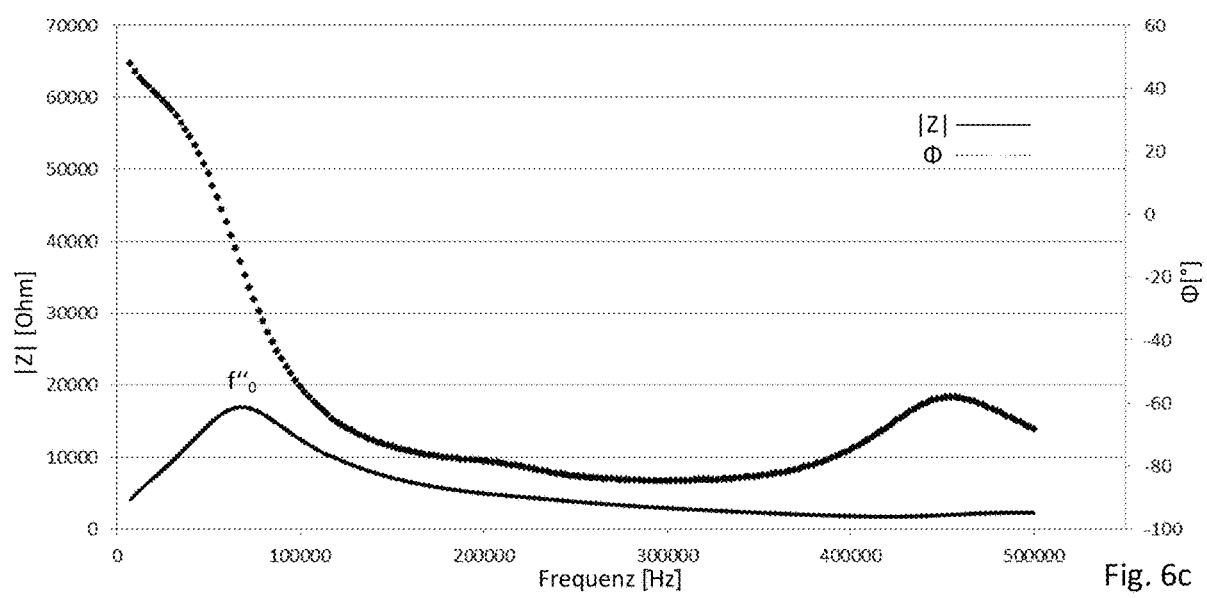
FIG. 6 shows state monitoring of the present disclosure based on an alternating signal in three graphs of the magnitude of impedance and phase as a function of frequency for different states of a coil.

Other embodiments of the present invention, are, finally, illustrated by FIGS. 5 and 6. Since the coil 17 is supplied with an excitation signal in the form of an alternating signal, additional statements can be made concerning the state of the coil 17. In this connection, FIG. 5 shows an electrical equivalent circuit diagram of a coil 17 with core 18. In such case, L is the inductance of the coil 17, $R_1$ the resistance of the coil 17, $R_2$ the equivalent ohmic series resistance, $R_{fe}$ the frequency dependent reactance and C the stray capacitance between the windings of the coil 17.

According to the invention, at least one value for the phase shift $\phi_1$ for a predeterminable frequency $f_1$ is compared with a desired-value for the phase shift $\phi_{ref,1}$ and a difference between the actual-value $\phi_f$ and the desired-value $\phi_{ref,1}$ ascertained. In the case of a defect in the region of the coil 17, such as, for example, a winding short or penetrated medium, there is a shifting of the curve of phase $\phi$ as a function of frequency f and so the value for $\phi_1$ at the frequency $f_1$ changes. Since, for example, a change of the quality Q of the oscillatory system can also occur in the case of a defect in the region of the coil 17, it is expedient to evaluate the phases $\phi_1$ and $\phi_2$ for at least two predeterminable frequencies $f_1$ and $f_2$ and to compare such with predeterminable desired values $\phi_{ref,1}$ and $\phi_{ref,2}$.

When the frequency f of the excitation signal is variable, especially also spectra of the impedance Z, the magnitude of the impedance |Z|, the amplitude A and/or phase $\phi$ between the excitation signal and the received signal as a function of frequency f can be generated and evaluated.

Corresponding spectra are shown in FIG. 6 and discussed in the following for better illustrating the behavior of the oscillatory system.

FIG. 6a shows spectra of the magnitude of the impedance |Z| and the phase $\phi$ for a fully functional coil 17. The magnitude of the impedance |Z| has a maximum value at the resonant frequency $f_0$, while the spectrum of the phase $\phi$ has there a point of inflection. The phase $\phi_1$ associated with the frequency $f_1$ can be taken into consideration as the desired-value $\phi_{ref,1}$ for the phase.

In the case, in which, for instance, a third of the coil 17 is short circuited, changed spectra occur, as shown in FIG. 6b. A short circuit lessens the inductance L of the coil 17 and, associated therewith, the resonant frequency shifts ($\Delta f_1$) in the positive direction in comparison with a fully functional coil 17. The resonant frequency $f'_0$ is shifted to a higher value relative to the resonant frequency $f_0$ of the fully functional coil, and, correspondingly, there is an analogous shifting of the curve of the spectrum of the phase $\phi$. Additionally because of the short circuit in the region of the coil 17, the quality Q of the oscillatory system changes.

As one can see based on the curves of the spectra, the phase associated with the frequency $f_1$ changes to the value $\phi'_1$ and no longer equals the predeterminable desired-value $\phi_{ref,1}$. If the difference exceeds a first predeterminable limit value, then the presence of a winding short can be assumed. Analogous ideas hold for the case, in which the phases $\phi_1$ and $\phi_2$ are evaluated for two predeterminable frequencies $f_1$ and $f_2$.

In the case of a cable break, there is a complete interruption of the oscillatory circuit.

In the case, in which, in contrast, a liquid medium or moisture comes in contact with the coil 17, there results, in contrast, a spectrum as shown in FIG. 6c. There is a change in the stray capacitance C between the windings of the coil 17, and, associated therewith, a negative shifting of the resonant frequency ($\Delta f_2$) in comparison with a fully functional coil.

As in the case of a short circuit, spectral curves changed also in the case of contact of the coil with a medium. In contrast with FIG. 6b, the resonant frequency $f''_0$ shifts, however, to a lower value. The frequency shift $\Delta f_2$ t is thus negative. The resonant frequency $f''_0$ is shifted to a lower value compared with the resonant frequency $f_0$ of the fully functional coil, and, correspondingly, there is an analogous shifting of the curve of the spectrum of the phase $\phi$. Additionally, the quality Q of the oscillatory system changes, because of the short circuit in the region of the coil 17.

As evident based on the curves of the spectra, the phase associated with frequency $f_1$ changes to the value $\phi''_1$ and, correspondingly, no longer equals the predeterminable desired-value $\phi_{ref,1}$. If the difference exceeds a first predeterminable limit value, then the presence of a winding short can be assumed. Analogous ideas hold here also for the case, in which phases $\phi_1$ and $\phi_2$ for two predeterminable frequencies $f_1$ and $f_2$ are evaluated.

Since the phase $\phi$ is analyzed supplementally to the explained considerations for the ohmic resistances R in connection with FIGS. 3 and 4, not just general statements relative to the functioning of the coil 17 can be generated. Rather, in many cases, winding shorts, cable breaks and defective electrical contactings, which lead to junction resistances, can be distinguished.

In summary, the present invention enables a state monitoring of a coil 17 in a measuring apparatus 1. Advantageously, with the present invention, a measuring apparatus 1 with a high measure of functional safety can be assured, since various malfunctions can be detected and distinguished from one another. The method of the invention can be executed periodically in predeterminable time intervals or as needed. Also, a state monitoring running simultaneously with ongoing measurement operation is possible in given cases, to the extent that a mutual influencing of the measuring- and diagnostic operation can be excluded.

The invention claimed is:

1. A method for monitoring a state of a coil having at least two connection wires, wherein the coil is part of an apparatus for determining at least one process variable of a medium in a containment, the method comprising:
   ascertaining a desired-value of an ohmic total resistance for the coil and the at least two connection wires;
   supplying the coil with a first electrical excitation signal that is an alternating signal having a first predeterminable frequency and receiving a first electrical, received signal from the coil via the at least two connection wires;
   ascertaining an actual-value of the ohmic total resistance based on the first received signal;
   comparing the actual-value with the desired-value and ascertaining a state indicator based on the comparison;
   ascertaining a first phase between the first excitation signal and the first received signal;
   ascertaining a first difference between the first phase and a desired-value for the first phase; and
   when the first difference exceeds a first predeterminable limit value, determining at least one winding short in the region of the coil.

2. The method as claimed in claim 1, further comprising:
   determining a difference between the actual-value and the desired-value and ascertaining the state indicator based on the difference.

3. The method as claimed in claim 1, further comprising:
   creating an electrical equivalent circuit for the ohmic total resistance of the coil and ascertaining the desired-value for the total resistance based on the equivalent circuit.

4. The method as claimed in claim 3,
   wherein each of the at least two connection wires is represented by a series circuit of a wire resistance and a wire defect resistance and wherein the coil is represented by a series circuit of a coil resistance and a coil defect resistance.

5. The method as claimed in claim 4, further comprising:
   assuming a predeterminable defect value for at least one wire defect resistance and/or the coil defect resistance.

6. The method as claimed in claim 1, wherein the state indicator is a statement of a presence of at least one winding short in a region of the coil or a statement of a poor electrical contacting or a cable break in the region of the coil or the at least two connection wires.

7. The method as claimed in claim 1,
when the first difference exceeds a second predeterminable limit value, determining a presence of moisture or medium in at least a region in which the coil is located.

8. The method as claimed in claim 1, further comprising:
supplying the coil with a second excitation signal having a second predeterminable frequency and receiving a second electrical, received signal from the coil via the at least two connection wires;
ascertaining a second phase between the second excitation signal and the second received signal; and
ascertaining a difference between the second phase and a desired-value for the second phase.

9. The method as claimed in claim 1,
wherein the coil is divided into at least two subcoils and provided with at least three connection wires,
wherein a first subcoil is contacted with a first wire and a second wire, and
wherein a second subcoil is contacted with the second wire and a third wire.

10. The method as claimed in claim 9, further comprising:
ascertaining at least one subresistance of a subcoil.

11. The method as claimed in claim 10, further comprising:
forming at least one ratio of a subresistance and the total resistance or a ratio between at least two subresistances.

12. An apparatus for determining and/or monitoring at least one process variable of a medium in a containment, comprising:
a coil; and
at least two connection wires,
wherein the apparatus is embodied to execute a method for monitoring a state of the coil, the method including:
ascertaining a desired-value of an ohmic total resistance for the coil and the at least two connection wires;
supplying the coil with a first electrical excitation signal that is an alternating signal having a first predeterminable frequency and receiving a first electrical, received signal from the coil via the at least two connection wires;
ascertaining an actual-value of the ohmic total resistance based on the first received signal;
comparing the actual-value with the desired-value and ascertaining a state indicator based on the comparison;
ascertaining a first phase between the first excitation signal and the first received signal;
ascertaining a first difference between the first phase and a desired-value for the first phase; and
when the first difference exceeds a first predeterminable limit value, determining at least one winding short in the region of the coil.

13. The apparatus as claimed in claim 12,
wherein the apparatus is a vibronic sensor comprising:
a mechanically oscillatable unit;
a driving/receiving unit having the coil and the at least two connection wires, wherein the driving/receiving unit is embodied to excite the mechanically oscillatable unit with an electrical excitation signal to cause the mechanically oscillatable unit to execute mechanical oscillations, and wherein the driving/receiving unit is further embodied to receive mechanical oscillations from the mechanically oscillatable unit and to convert the received mechanical oscillations into an electrical, received signal; and
an electronics unit embodied starting from the received signal to produce the excitation signal, and from the received signal to ascertain the at least one process variable.

* * * * *